(12) United States Patent
Guilley et al.

(10) Patent No.: US 8,612,069 B2
(45) Date of Patent: Dec. 17, 2013

(54) METHOD FOR DYNAMICALLY CONSOLIDATING ITEMS OF AN AERONAUTICAL PROCEDURE

(75) Inventors: Fabien Guilley, Merenvielle (FR); Gabrielle De Brito, Lapeyrouse-Fossat (FR); Gilles Francois, Toulouse (FR)

(73) Assignee: Thales, Neuilly sur Seine (FR)

( * ) Notice: Subject to any disclaimer, the term of this patent is extended or adjusted under 35 U.S.C. 154(b) by 332 days.

(21) Appl. No.: 12/978,500

(22) Filed: Dec. 24, 2010

(65) Prior Publication Data

US 2012/0029736 A1 Feb. 2, 2012

(30) Foreign Application Priority Data

Dec. 30, 2009 (FR) ..................... 09 06403

(51) Int. Cl.
*G01M 17/00* (2006.01)
(52) U.S. Cl.
USPC ................. 701/9; 701/3; 701/29.1; 701/32.7; 340/945; 244/75.1; 244/220
(58) Field of Classification Search
USPC ......... 701/3, 14, 9, 29.1, 32.7, 34.2; 340/963, 340/971, 945; 244/75.1, 220, 234, 194
See application file for complete search history.

(56) References Cited

U.S. PATENT DOCUMENTS 6,912,453 B2 * 6/2005 Le Draoullec et al. ...... 701/31.6
2009/0292951 A1 11/2009 Fournier et al.

FOREIGN PATENT DOCUMENTS

FR 2 931 264 A1 11/2009

OTHER PUBLICATIONS

Everett Palmer et al.: "Electronic Checklists: Evaluation of Two Levels of Automation", Proceedings of the Sixth International Aviation Psychology Symposium (pp. 178-183). Columbus, Ohio: The Ohio State University.
National Transportation Safety Board: "Aircraft Accident Report", Northwest Airlines, Inc., McDonnell Douglas DC-9-82, N312RC, Romulus, Michigan, Aug. 16, 1987.

* cited by examiner

*Primary Examiner* — Thomas Tarcza
*Assistant Examiner* — Adam Tissot
(74) *Attorney, Agent, or Firm* — Baker & Hostetler LLP

(57) ABSTRACT

A method is provided for dynamically consolidating items of an aeronautical procedure in order to present to the operator the best action to perform according to the context of all the systems, in order to reduce his cognitive workload faced with an action to be carried out. The method consists, for each item of a procedure, in determining the text of the requested action, in choosing the text of the corresponding response that the crew must perform according to the general state and the configuration of the aircraft, in incorporating in the corresponding item the texts of the requested action and of the corresponding response, in displaying this duly enriched item, in detecting whether the requested action has indeed been accomplished and in displaying the result of this detection.

2 Claims, 1 Drawing Sheet

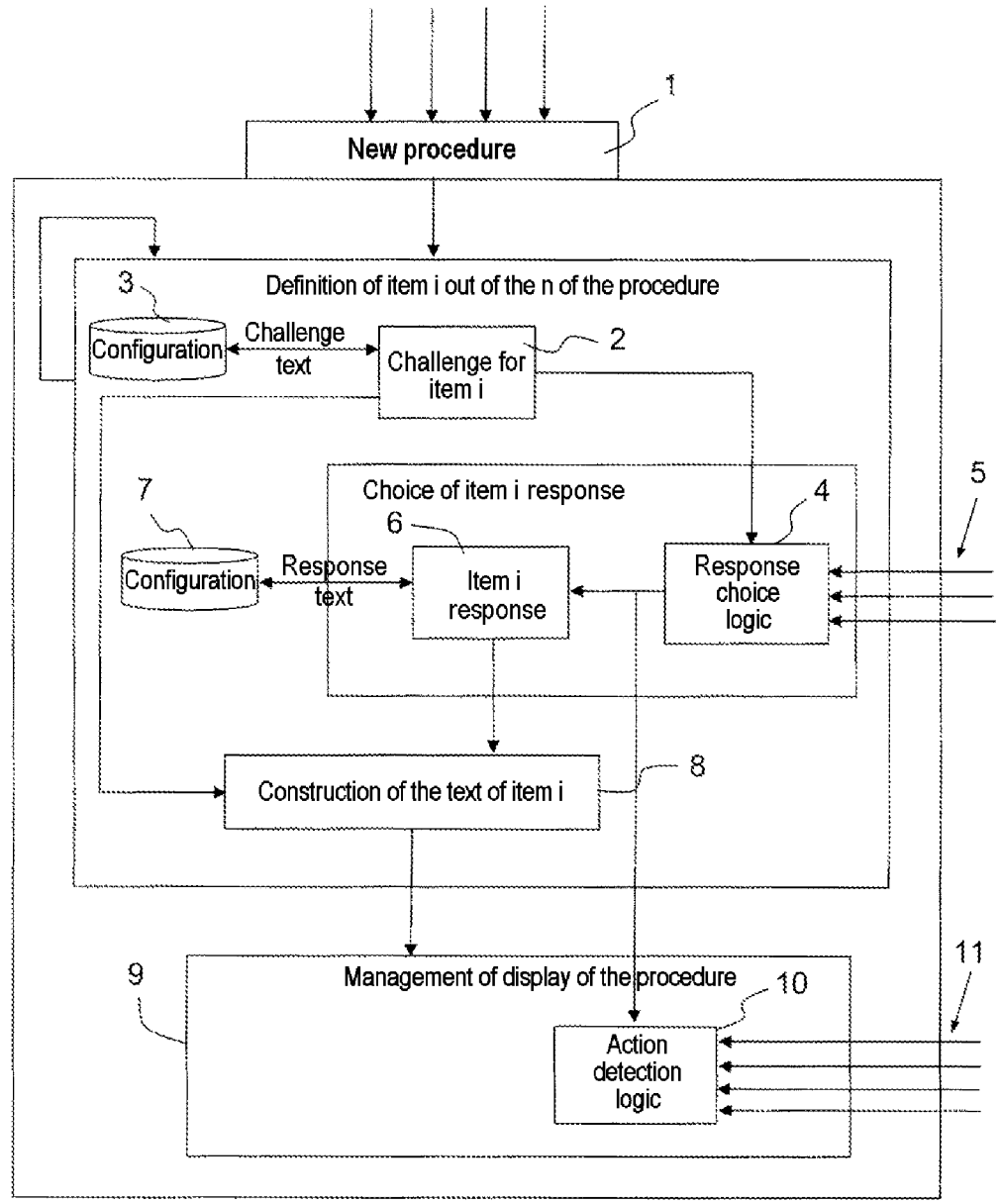

METHOD FOR DYNAMICALLY CONSOLIDATING ITEMS OF AN AERONAUTICAL PROCEDURE

CROSS-REFERENCE TO RELATED APPLICATION

This application claims priority to foreign French patent application No. FR 0906403, filed on Dec. 30, 2009, the disclosure of which is incorporated by reference in its entirety.

FIELD OF THE INVENTION

The present invention relates to a method for dynamically consolidating items (elements) of an aeronautical procedure.

BACKGROUND

In an aircraft provided with an electronic flight management system, the crew of an aircraft (pilot-in-command and co-pilot) moves around in a loaded cognitive environment. In practice, it is subject to many visual and auditory stimuli.

These stimuli are as follows:
Visual:
screens displaying different pages,
control panels,
indicators on the ceiling panel,
knob positions ("C/B", selector switch, etc.),
"Master Warning" or "Master Caution" (warnings),
Audio:
operational alerts ("PULL UP", "TERRAIN" from the "TAWS", altitude announcement when landing),
audio alerts in the event of failure: "single chime" or "continuous repetitive chime" (single or continuous repetitive alerts),
ATC (Air Traffic Control),
Messages issued by the airline: management of the CC (cabin crew), and so on,
Sensitive:
"Shaker" (in stall cases).

It will also be noted that smell may add stress (case of fire, or smoke, etc).

Also, in order to manage the various systems and handle the basic piloting of the aircraft, the crew must perform the following various tasks, concurrently:
primary controls: control column, rudder bar, engine power, propeller pitch, compensator, and so on,
regular check on flight safety: primary flight parameters (engine, speed, attitude), environment (other aircraft, terrain, etc.), management of failures (procedures to be carried out in the event of failure),
navigation (precise/complex information to be entered by the crew, such as the flight plan),
ATC (passive listening to commands from the controller and active dialogue with the controller),
management of messages issued by the airline managing the aircraft ("ACARS" messages),
passenger and cabin crew information.

While all these tasks are being carried out, the crew may be interrupted. The systems must be made so as not to overload the work of the crew, by giving indications that are precise (no thought needed to specify a requested action) and reliable (the crew must not question the indication made by the system).

In the case of the FWS (flight warning system), the procedures request performance of the action "as required" (the pilot must himself determine the correct position or action, the requested action being true in more than 90% of cases, but, in a few remaining cases, the action to be carried out is different).

Also, two different procedures may arise in the same flight and have an item in common for which the requested action is different and therefore inconsistent. The first of these procedures corresponds to the case where the action to be carried out is the same in most cases, therefore the procedure contains this action. In this case, the manufacturer of the system assumes that the pilot can exercise his critical faculty and conduct an action that is different from the requested action if he considers that this requested action is not suited to the situation. In the second case, the action to be carried out for the current procedure depends on the situation (state of the aircraft, surrounding conditions, etc.), and the procedure requests the action to be carried out "as required". In both these cases, the pilot must carry out a cognitive action, whereas from his training he is primarily accustomed to automatic procedures.

Thus, the crew has to be aware of the state of the aircraft in order to deal with certain requested actions.

The current flight management systems have the following characteristics:
Auto-acknowledgement of certain lines of the procedure, because the system detects the correct state linked to the requested action (dynamic modification of the style of presentation of a line).
Non-presentation of a line when there is no action to be carried out (dynamic presentation or non-presentation of a line).

SUMMARY OF THE INVENTION

An object of the present invention is a method for dynamically consolidating items (elements) of an aeronautical procedure in order to present to the operator the best action to perform according to the context of all the systems (configuration, failures present, operational conditions), in order to reduce his cognitive workload faced with an action to be carried out, to give him confidence in the electronic flight management system and to ensure an identical presentation of the procedure for all the flights that use this system and this method.

The method according to the invention is characterized in that it consists, for each item of a procedure, in determining the text of the requested action, in choosing the text of the corresponding response that the crew must perform according to the general state and the configuration of the aircraft, in incorporating in the corresponding item the texts of the requested action and of the corresponding response, in displaying this duly enriched item, in detecting whether the requested action has indeed been accomplished and in displaying the result of this detection.

BRIEF DESCRIPTION OF THE DRAWING

The present invention will be better understood on reading the detailed description of an embodiment, taken as a non-limiting example and illustrated by the appended drawing, in which:

the single FIGURE is a simplified block diagram of a device for implementing the inventive method.

DETAILED DESCRIPTION

The present invention is described in detail below with reference to an FWS procedure of an aircraft, but obviously it is not limited to this single aeronautical procedure, and it can be applied to other procedures.

According to an important characteristic of the invention, the "challenge" (requested action) and "response" (response of the crew as a consequence of the requested action, commonly designated "response") information items are introduced into each procedure item.

The difficulties explained above stem from the fact that the texts associated with the response are not precise or are not reliable. The present invention makes it possible to assign the text associated with the response dynamically at the moment when the procedure is presented as a logic function.

The timing diagram of the single FIGURE of the drawing shows the sequence of the essential steps of one implementation of the inventive method. According to the inventive method, and as diagrammatically illustrated by said timing diagram, when a new procedure 1, comprising n items, is selected (for example, the FWS function, based on events relating to the aircraft or based on an FWS alert), the FWS system dynamically constructs the modified procedure, in accordance with the invention. The single FIGURE of the drawing diagrammatically illustrates the processing of the item of rank i ($1 \leq i \leq n$), this processing being repeated for each of the n items of the procedure 1. This construction is done as follows.

Each item i has a corresponding "challenge" element. This element, referenced 2 in the drawing, may be directly a text (originating from a database for example) or, more advantageously, a reference made to the content of a database 3 containing all the challenges and supplying the text of the challenge of rank i corresponding to the item of rank i. This is because a reference makes it possible to limit the space needed in memory, since a single reference can be used to construct several items.

Once the challenge has been selected, the FWS management system chooses the most appropriate associated response. For this, it invokes a logic function 4, forming part of the FWS program. This logic function 4 receives information 5 which take into account the general state of the aircraft (equipment items failed or degraded, for example: electrical generation of direct current), degraded functions (loss of aircraft manoeuvrability as a result of jammed flaps), the configuration of the aircraft (to know which are the systems installed (optional or redundant)) and the other procedures already carried out by the crew. This logic function makes it possible to choose the correct response accurately and reliably. This logic function 4 will not be described in detail because its production is obvious to those skilled in the art upon reading the present description.

The result of the processing carried out by the logic function 4 makes it possible to obtain the corresponding response 6. In the present case, the function 4 refers to the response 6 by sending an address of a determined response to a database 7 containing the list of the texts of all the possible responses. However, such a database is not absolutely necessary, and these texts may be directly generated by the FWS system program.

Once the challenge 2 and the response 6 have been determined, the FWS system constructs the text 8 of the procedure item i', corresponding to the original item i and "enriched" for example with the addition of points, lines, etc. The device 9 for managing the display of the procedures concerned then controls the display of the enriched items as they are processed.

The result of the processing performed by the logic function 4 is reintegrated into the FWS program, which makes it possible to know whether the required action has been carried out by the crew ("sensed item" type response). This is determined by the program of the display management device 9 which includes a logic function 10 which receives, in addition to the information for the function 4, information 11 indicating the detection or non-detection of said action of the crew. This logic function 4 will not be described in detail because its production is obvious to those skilled in the art from reading the present description.

The following simplified example (in italics) of such a logic function corresponds to a smoke detection procedure. If the smoke is due to the air conditioning (the system is called PACK), the corresponding air conditioning system must be switched off, unless the opposite (redundant) system is already off (otherwise, there will be no more air conditioning, this conditioning including pressurization and temperature setting):

Challenge: "PACK 2"
Response:
if PACK 1 is ON, set "OFF"=>"PACK 2 . . . OFF"
if PACK 1 is OFF, set "ON"=>"PACK 2 . . . ON"

It will be noted that the inventive solution can be incorporated in any avionics system regardless of the formatting of the procedure (by page or item by item).

In the current avionics systems (not originally including means for implementing the inventive method), the procedure line containing the item i' may not appear on the device for displaying procedures if this item is detected ("item sensed") in the correct position: the display of the procedure is therefore different from one avionics system to another. Also, in this case, the crew does not even see that there is an action to be carried out in the procedure (which is admittedly already done). In this case, the crew is not "looped" into the processing of a challenge to revert to a healthier state.

The present invention will always make it possible to present the action to be carried out and detect the execution thereof according to the expected response and the aircraft state. Because the procedure line appears on the device for displaying procedures in all cases, the pilot will always see the action to be carried out, only the response possibly differing, and he will have to carry it out only if the expected response is not the one actually detected on the aircraft.

The invention claimed is:

1. A method executed by a Flight Warning System (FWS) of an aircraft for determining and displaying to a crew items of an aeronautical alert procedure,
   an item comprising a challenge and a response, a challenge corresponding to a system on which the crew has to act, and a response corresponding to a state of the system requested by the FWS that the crew must perform, and
   an item text displayed to the crew comprising a challenge text and a response text,
   said method comprising, for each item of the aeronautical alert procedure, the steps of:
       determining the challenge and corresponding challenge text, the challenge and corresponding text being determined by a reference made to a content of a database containing all the challenges and supplying the corresponding text of the challenge;
       dynamically determining an appropriate response and corresponding response text by using a logic function taking into account a general state of the aircraft, a configuration of the aircraft and other procedures already carried out by the crew;
       generating the item text by consolidating the challenge text and the appropriate response text;
       displaying the item text;

detecting whether the requested state has been obtained; and displaying a result of the detection.

2. The method according to claim 1, wherein the text of the requested action or of the corresponding response is chosen from at least one database containing all possible texts.

\* \* \* \* \*